US012788182B2

(12) United States Patent
Wang

(10) Patent No.: US 12,788,182 B2
(45) Date of Patent: Nov. 10, 2026

(54) MULTIFUNCTIONAL CONTROL ASSEMBLY AND CHARCOAL OVEN

(71) Applicant: Haohong Electric Technology (Hubei) Co., Ltd., Huanggang (CN)

(72) Inventor: Min Wang, Huanggang (CN)

(73) Assignee: Haohong Electric Technology (Hubei) Co., Ltd., Huanggang (CN)

( * ) Notice: Subject to any disclaimer, the term of this patent is extended or adjusted under 35 U.S.C. 154(b) by 370 days.

(21) Appl. No.: 18/400,513

(22) Filed: Dec. 29, 2023

(65) Prior Publication Data

US 2025/0127331 A1 Apr. 24, 2025

(30) Foreign Application Priority Data

Oct. 18, 2023 (CN) ......................... 202322805251.4

(51) Int. Cl.
*A47J 37/07* (2006.01)

(52) U.S. Cl.
CPC ....... *A47J 37/0786* (2013.01); *A47J 37/0718* (2013.01); *A47J 37/0763* (2013.01)

(58) Field of Classification Search
CPC ................ A47J 37/0786; A47J 37/0718; A47J 37/0763; A47J 37/0704
USPC ........................................................ 126/25 R
See application file for complete search history.

(56) References Cited

U.S. PATENT DOCUMENTS 4,759,342 A * 7/1988 Lee ......................... A47J 27/04 99/347
7,832,330 B1 11/2010 Thompson
12,022,839 B2 * 7/2024 Ish-Hurwitz ........ A47J 37/0786

FOREIGN PATENT DOCUMENTS

KR 20080094872 A * 10/2008 .......... A47J 37/0786
KR 102377194 B1 * 3/2022 .......... A47J 37/0786
WO 2016149106 A1 9/2016

OTHER PUBLICATIONS

European Search Report issued in counterpart European Patent Application No. EP 23220733.2, dated May 10, 2024.

* cited by examiner

*Primary Examiner* — Allen R. B. Schult
*Assistant Examiner* — William C Weinert
(74) *Attorney, Agent, or Firm* — Westbridge IP LLC

(57) ABSTRACT

Disclosed are a multifunctional control assembly and a charcoal oven. The multifunctional control assembly is applied to the charcoal oven. The charcoal oven has a fuel rack for placing charcoals. The multifunctional control assembly includes a partition member and an extension member. The partition member is provided on the fuel rack and configured to partition the fuel rack into a concentration zone located at an inner side of the partition member and a dispersal zone located at an outer side of the partition member. The extension member is provided on the partition member and in contact with the partition member, and a storage groove for storing water or spices is formed at the extension member.

7 Claims, 4 Drawing Sheets

MULTIFUNCTIONAL CONTROL ASSEMBLY AND CHARCOAL OVEN

CROSS-REFERENCE TO RELATED APPLICATIONS

This application claims priority to Chinese Patent Application No. 202322805251.4, filed on Oct. 18, 2023, the entire contents of which are incorporated herein by reference.

TECHNICAL FIELD

The present application relates to the technical field of roasting devices, and in particular to a multifunctional control assembly and a charcoal oven.

BACKGROUND

With the improvement of people's living standard, various ovens have come into every household. The oven is a kind of device that generates hot air to roast and cook foods and is generally of closed or semi-closed structure. The oven of different structures uses different types of fuel, and the common fuel type includes charcoals, gas and etc.

The oven using charcoals as the fuel needs to be provided with a fuel rack for placing charcoals, the fuel rack is arranged under the grill, so that foods on the grill can be roasted by the charcoals on the fuel rack. However, a conventional charcoal oven generally only has the regular roasting function, and the function is relatively simple.

SUMMARY

The main objective of the present application is to provide a multifunctional control assembly, aiming to achieve the multifunction of the charcoal oven.

To achieve the above objective, the multifunctional control assembly proposed by the present application is applied to a charcoal oven, the charcoal oven has a fuel rack for placing charcoals, and the multifunctional control assembly includes a partition member and an extension member. The partition member is provided on the fuel rack and configured to partition the fuel rack into a concentration zone located at an inner side of the partition member and a dispersal zone located at an outer side of the partition member. The extension member is provided on the partition member and in contact with the partition member, and a storage groove for storing water or spices is formed at the extension member.

In some embodiments, the partition member has a narrow end and a flared end, the partition member is configured to gradually shrink in a direction from the flared end to the narrow end, and the flared end is configured to face the fuel rack.

In some embodiments, the extension member has a first side wall, a second side wall and two third side walls. The first side wall fits a profile of an outer wall of the partition member, the second side wall is connected to an end of the first side wall close to the flared end, the two third side walls are spaced apart and connected to the first side wall and the second side wall, and the first side wall, the second side wall and the two third side walls enclose to form the storage groove with an opening towards the narrow end.

In some embodiments, the multifunctional control assembly further includes a heat insulation plate. A connection hole is formed at the heat insulation plate, the connection hole is sleeved on a periphery wall of the narrow end, and the heat insulation plate is extended away from the narrow end.

In some embodiments, the heat insulation plate includes a plurality of plate-shaped units. The plate-shaped units are connected one by one in sequence along a circumferential direction of the narrow end and are enclosed to form the connection hole, and the plate-shaped units are detachably connected.

In some embodiments, each of the plate-shaped units is provided with a limit clamping slot at one side edge and an inserting member at another side edge, and the inserting member is inserted into the limit clamping slot between two neighboring plate-shaped units.

In some embodiments, at least two storage grooves are formed on the extension member, and the storage grooves are provided on the partition member along a circumferential direction of the partition member.

In some embodiments, the partition member is detachably connected to the extension member.

In some embodiments, one of the partition member and the extension member is provided with a hanging catch, the other one of the partition member and the extension member is provided with a hanging hole, and the hanging catch is threaded through and connected to the hanging hole, so that the extension member is hung on the partition member.

The present application further proposes a charcoal oven, which includes an oven body, the multifunctional control assembly as mentioned above and a grill. The oven body is formed with a roasting chamber, a fuel rack is provided in the roasting chamber. The multifunctional control assembly is provided on the fuel rack. The grill is provided in the roasting chamber and connected to a chamber wall of the roasting chamber, and the grill is located above the multifunctional control assembly.

In the technical solution of the present application, when placing the multifunctional control assembly in the charcoal oven to use, the partition member is placed on the fuel rack, so that the fuel rack is partitioned into a concentration zone located at the inner side of the partition member and a dispersal zone located at the outer side of the partition member. When compared with the dispersal zone, the area of the concentration zone for placing charcoals is relatively small, so that a relative less amount of charcoals is needed to achieve stacking the charcoals, which makes the roasting firepower of the concentration zone is relatively strong. On the other hand, the dispersal zone needs a large amount of charcoals to achieve stacking the charcoals to raise the roasting temperature, therefore, the dispersal zone is applicable for roasting with relative low temperature. During the roasting process, both the inner side and the outer side of the partition member are placed with burning charcoals, and the temperature of the partition member is then raised to a relatively high level. By providing the extension member on the partition member, and then adding water or spices into the storage groove, the heat generated by the burning of the charcoal and the heat of the partition member heat the water in the storage groove to produce steam, and the steam can be used to smoke foods. When the storage groove is added with spices, the heat can boost the flavor of the spices, which makes the smoked foods to have a unique flavor corresponding to the spices. In this way, when the multifunctional control assembly in this technical solution is applied to the charcoal oven, it can be partitioned into a high temperature roasting zone and a low temperature roasting zone, so that different foods can be roasted in different ways. In addition, the charcoal oven is allowed to have a smoking function, and the multifunction of the charcoal oven is realized.

BRIEF DESCRIPTION OF THE DRAWINGS

In order to more clearly illustrate the technical solutions in the embodiments of the present application or in the prior art, drawings that are needed to illustrate the embodiments or the prior art are simply introduced below. Obviously, drawings introduced below are just some of the embodiments in the present application. For those of ordinary skill in the art, other figures can be further obtained without creative efforts according to the structures shown in drawings below.

Figure 1:
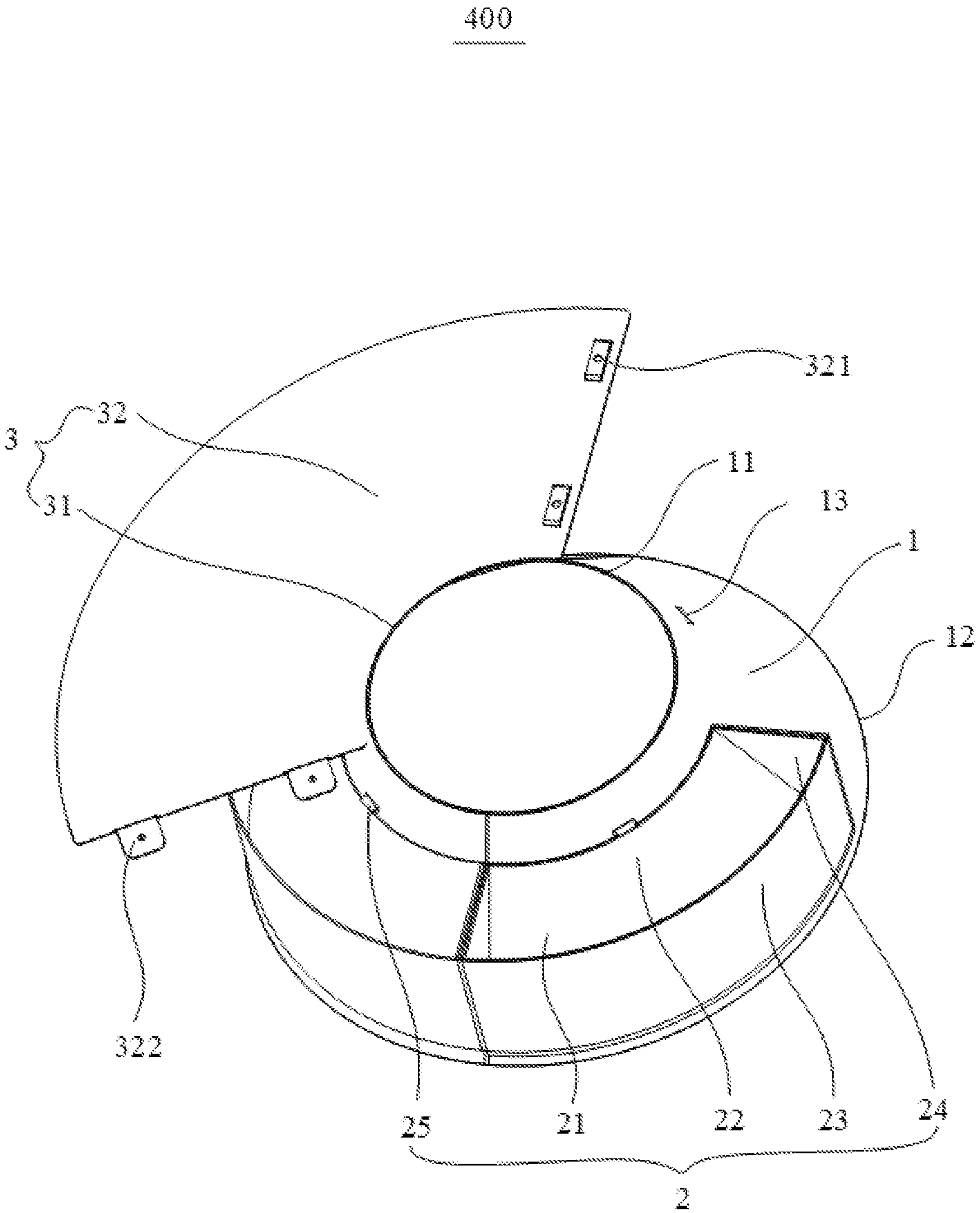
FIG. 1 is a schematic structural view of a multifunctional control assembly according to an embodiment of the present application.

The realization of the purpose, the functional feature, and the advantage of present application will be further illustrated referring to the drawings.

DETAILED DESCRIPTION OF THE EMBODIMENTS

The technical solutions of the embodiments of the present application will be described in more detail below in conjunction with the accompanying drawings. It is obvious that the embodiments to be described are only some rather than all the embodiments of the present application. All other embodiments obtained by those skilled in the art based on the embodiments of the present application without creative efforts should fall within the scope of the present application.

It should be noted that all the directional indications (such as up, down, left, right, front, rear, etc.) in the embodiments of the present application are only used to explain the relative positional relationship, movement, etc. among the components in a certain posture (as shown in the drawings). If the specific posture changes, the directional indication will change accordingly.

Besides, the descriptions defined with “first”, “second”, etc. in the present application are merely for descriptive purposes, and cannot be understood as indicating or suggesting relative importance or impliedly indicating the number of the indicated technical feature. Therefore, the features defined with “first” or “second” can expressly or implicitly include at least one such feature. In addition, the technical solutions of the various embodiments can be combined with each other, but the combinations must be based on the realization by those skilled in the art. When the combination of technical solutions is contradictory or cannot be achieved, it should be considered that such a combination of technical solutions does not exist, nor does it fall within the scope of the present application.

Figure 2:
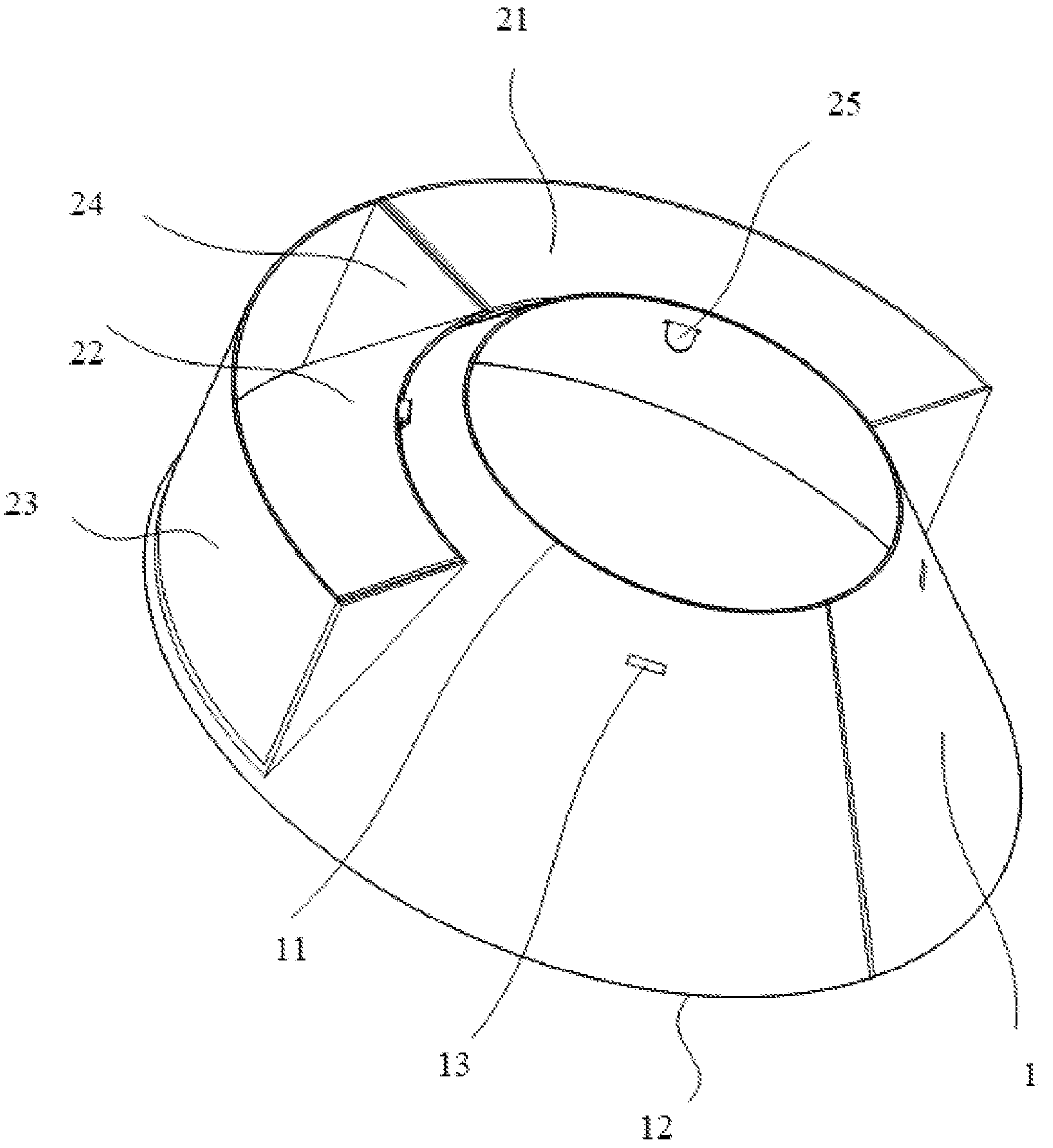
FIG. 2 is a schematic structural view of a part of the structure in FIG. 1.

The present application provides a multifunctional control assembly 400, FIGS. 1 and 2 show an embodiment of the present application.

In the embodiment of the present application, as shown in FIGS. 1 and 2, the multifunctional control assembly 400 is applied to a charcoal oven 1000. The charcoal oven 1000 is provided with a fuel rack 200 for placing charcoals. The multifunctional control assembly 400 includes a partition member 1 and an extension member 2. The partition member 1 is provided on the fuel rack 200 and configured to partition the fuel rack 200 into a concentration zone located at an inner side of the partition member 1 and a dispersal zone located at an outer side of the partition member 1. The extension member 2 is provided on the partition member 1 and in contact with the partition member 1. A storage groove 21 for storing water or spices is formed at the extension member 2.

In the technical solution of the present application, when placing the multifunctional control assembly 400 in the charcoal oven 1000 to use, the partition member 1 is placed on the fuel rack 200, so that the fuel rack 200 is partitioned into a concentration zone located at the inner side of the partition member 1 and a dispersal zone located at the outer side of the partition member 1. When compared with the dispersal zone, the area of the concentration zone for placing charcoals is relatively small, so that a relative less amount of charcoals is needed to achieve stacking the charcoals, which makes the roasting firepower of the concentration zone is relatively strong. On the other hand, the dispersal zone needs a large amount of charcoals to achieve stacking the charcoals to raise the roasting temperature, therefore, the dispersal zone is applicable for roasting with relative low temperature. During the roasting process, both the inner side and the outer side of the partition member 1 are placed with burning charcoals, and the temperature of the partition member 1 is then raised to a relatively high level. By providing the extension member 2 on the partition member 1, and then adding water or spices into the storage groove, the heat generated by the burning of the charcoal and the heat of the partition member 1 heat the water in the storage groove to produce steam, and the steam can be used to smoke foods. When the storage groove 21 is added with spices, the heat can boost the flavor of the spices, which makes the smoked foods to have a unique flavor corresponding to the spices. In this way, when the multifunctional control assembly 400 in this technical solution is applied to the charcoal oven 1000, it can be partitioned into a high temperature roasting zone and a low temperature roasting zone, so that different foods can be roasted in different ways. In addition, the charcoal oven 1000 is allowed to have a smoking function, and the multifunction of the charcoal oven is realized.

In order to enhance the fire-focusing effect of the partition member 1, as shown in FIGS. 1 and 2, in an embodiment, the partition member 1 has a narrow end 11 and a flared end 12. The partition member 1 is configured to gradually shrink along the direction of the flared end 12 pointing to the narrow end 11. When the flared end 12 is arranged on the fuel rack 200, the area enclosed by the flared end 12 of the partition member 1 on the fuel rack is larger, which allows more charcoals to be placed. Meanwhile, the diameter of the partition member 1 is gradually reduced in the direction towards the narrow end 11, thus the heat generated by the relatively large amount of charcoals in the partition member 1 is gathered and released from the narrow end 11, creating a fire-focusing high temperature zone directly above the narrow end 11, and significantly enhancing the fire-focusing effect.

In order to implement the extension effect to the functions of the extension member 2, in an embodiment, as shown in FIGS. 1 and 2, the extension member 2 has a first side wall 22, a second side wall 23 and two third side walls 24. The first side wall 22 fits the profile of the outer wall of the partition member 1, so that more heat can be transferred from the partition member 1 to the extension member 2, which facilitates the evaporation of the water in the storage groove 21 or boosting the flavor of the spices. The second side wall 23 is connected to an end of the first side wall 22 close to the flared end 12. The two third side walls 24 are spaced apart and connected to the first side wall 22 and the second side wall 23. The first side wall 22, the second side wall 23 and the two third side walls 24 enclose to form the storage groove 21 with an opening towards the narrow end 11. That is, the bottom of the storage groove is not a plane surface but is formed by the connection of the ends of the first side wall 22 and the second side wall 23 closed to the flared end 12. In this way, it not only facilitates heating the water and the spices in the storage groove 21, but also will not occupy too much space on the outer side of the partition member 1, and leaves enough space for placing charcoals to the outer side portion of the partition member 1.

In order to prevent a reduction of smoking effect or even a failure of smoking in the multifunctional control assembly 400 resulted by the overheating of the foods during the smoking process, in an embodiment, as shown in FIG. 1, the multifunctional control assembly 400 further includes a heat insulation plate 3. A connection hole 31 is form at the heat insulation plate 3, the connection hole 31 is sleeved on the periphery wall of the narrow end 11, and the heat insulation plate 2 is extended away from the narrow end 11. The heat insulation plate 3 is used while smoking, and during the smoking process, the heat insulation plate 3 is located between the outer side portion of the partition member 1 and the foods to be smoked, which prevents that the burning charcoals at the outer side of the partition member 1 directly heats the foods to be smoked, and prevents the flame directly touching the foods and causing a local temperature to be too high.

In order to facilitate the installation and disassembly of the heat insulation plate 3, in an embodiment, as shown in FIG. 1, the heat insulation plate 3 includes multiple plate-shaped units 32. The plate-shaped units 32 are connected with each other one by one in sequence along the circumferential direction of the narrow end 11 to enclose and form the connection hole 31. The plate-shaped units 32 are detachably connected with each other. Since the heat insulation plate 3 is used only when smoking foods, the heat insulation plate 3 will be put in to install and disassembled to take out many times during the service life of the charcoal oven 1000. By configuring the heat insulation plate 3 as multiple detachable plate-shaped units 32, even in a situation where there is no enough space for placing other items inside the charcoal oven, the heat insulation plate 2 can still be installed inside the charcoal oven 1000 by putting in each of the plate-shaped units 32 one by one and assembling them, so that the ability to cope with the risk of insufficient installation space is undoubtedly increased.

As shown in FIG. 1, each of the plate-shaped units 32 is provided with a limit clamping slot 321 at one side edge and an inserting member 322 at another side edge. The detachable connection between two of the plate-shaped units 32 is realized by inserting the inserting members 322 of one plate-shaped unit 32 into the limit clamping slots 321 of another plate-shaped unit 32. The limit clamping slots 321 also provide a limit in the up and down direction to the plate-shaped units 32 to prevent a connection failure due to the gravity.

It should be noticed that even only one plate-shaped unit 32 is shown in FIG. 1, but in this embodiment, the heat insulation plate 2 consists of multiple plate-shaped units 32, and the multiple plate-shaped units 32 are assembled together to form the ring-shaped heat insulation plate 3.

The number of the storage groove 21 formed on the extension member 2 is not limited though, but in order to allow the extension member 2 to realize the function of mixed smoking of the steam and spices, in an embodiment, at least two storage grooves 21 are formed on the extension member 2, and each storage groove 21 is provided on the partition member 1 along the circumferential direction of the partition member 1, so that separating storage of the steam and spices can be achieved, and the mixed smoking of the steam and spices is realized.

In an embodiment, the partition member 1 and the extension member 2 are detachably connected. Since the storage groove 21 of the extension member 2 can be used to store steam or spices, when the storage groove 21 is stored with spices and it needs to change the spices or add other spices, the entire partition member 1 needs to be taken out if the extension member 2 cannot detach from the partition member 1, which is undoubtedly very troublesome and seriously disrupts the smoking rhythm. Therefore, the detachable connection between the extension member 2 and the partition member 1 greatly improves the convenience when it needs to change the spices or add water.

In order to implement the detachable connection between the extension member 2 and the partition member 1, in an embodiment, as shown in FIGS. 1 and 2, one of the extension member 2 and the partition member 1 has a hanging catch 25, and the other one of the extension member 2 and the partition member 1 has a hanging hole 13. The extension member 2 is detachably connected to the partition member by the cooperation of the hanging catch 25 and the hanging hole 13. When the hanging catch 25 is provided on the extension member 2, the tail end of the hanging catch 25 is extended downwards, so that the extension member 2 is allowed to be hung on the partition member 1 after the hanging catch 25 is inserted into the hanging hole 13. When the hanging catch 25 is provided on the partition member 1, the tail end of the hanging catch 25 is extended upwards to allow the extension member 2 to be hung on. In this embodiment, the hanging catch 25 is provided on the extension member 2, so as to avoid opening holes on the extension member 2 and causing the water or spices in the storage groove 21 to be more easily dropped.

Figure 3:
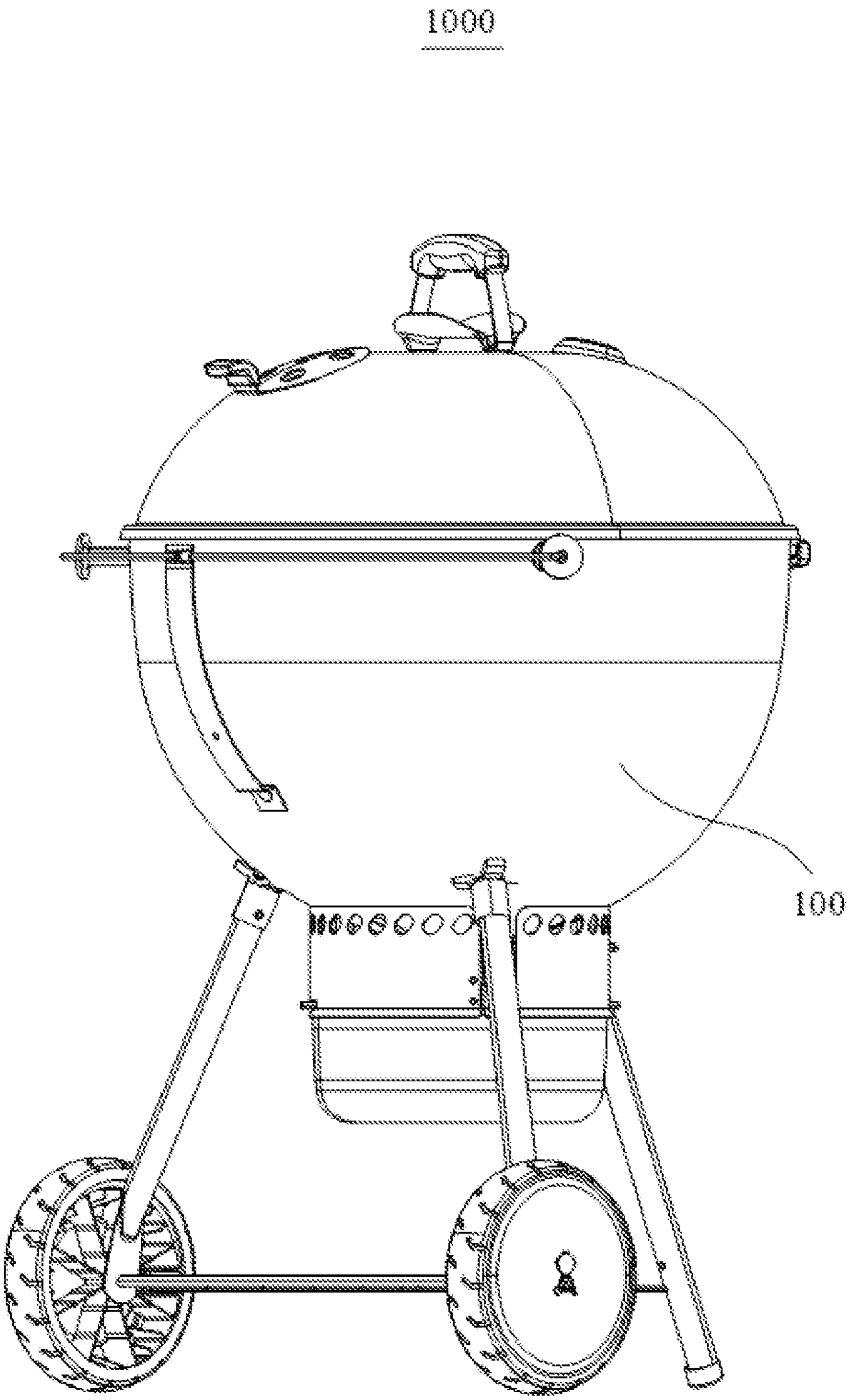
FIG. 3 is a schematic structural view of a charcoal oven according to an embodiment of the present application.
Figure 4:
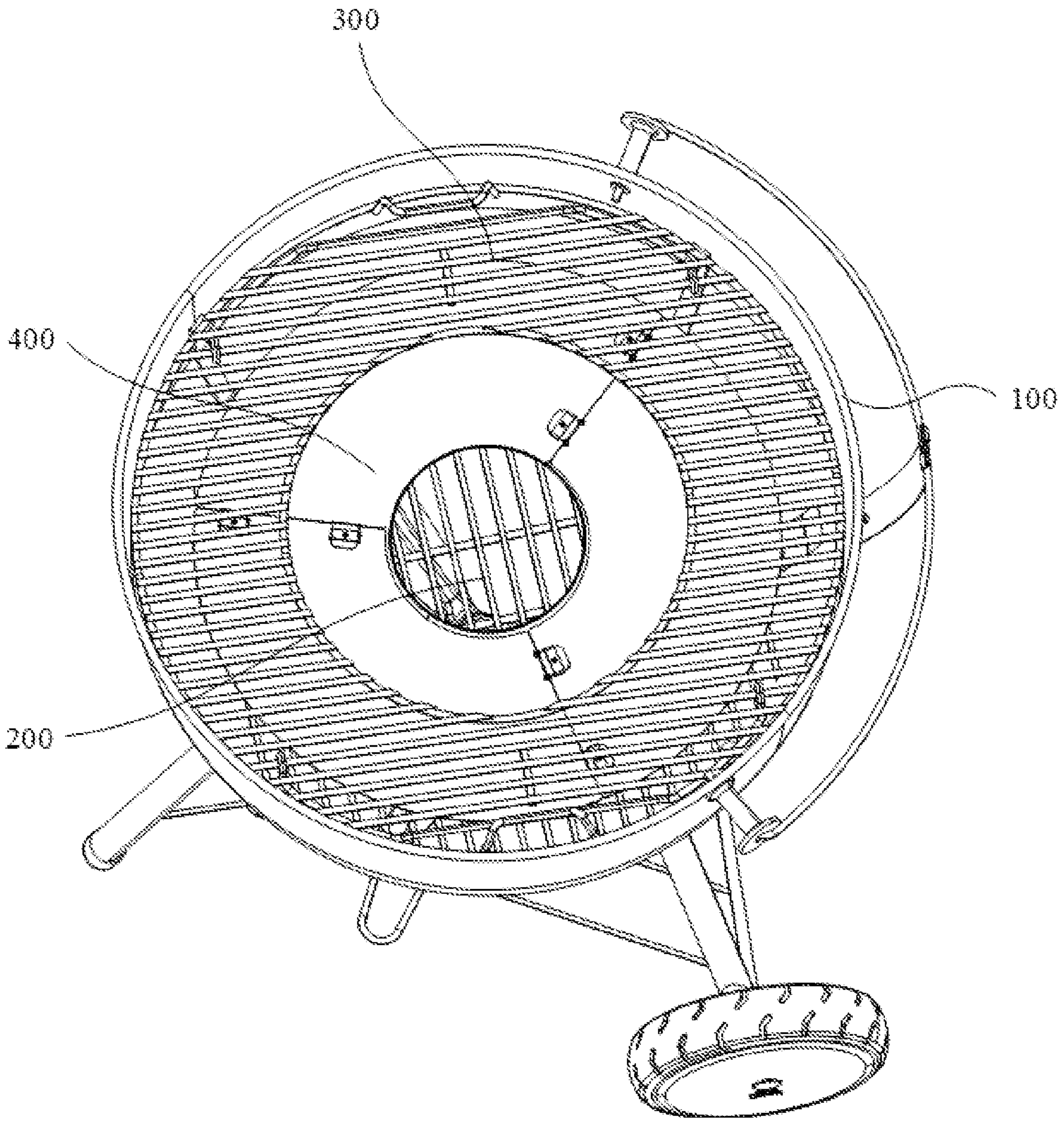
FIG. 4 is a schematic structural view of a part of the structure in FIG. 3.

The present application further provides a charcoal oven 1000, as shown in FIGS. 3 and 4, the charcoal oven 1000 includes an oven body 100, a multifunctional control assembly 400 and a grill 300. A roasting chamber is formed at the oven body 100, a fuel rack 200 is provided in the roasting chamber, the multifunctional control assembly 400 is provided on the fuel rack 200, the grill 300 is provided in the roasting chamber and connected to the chamber wall of the roasting chamber, and the grill 300 is located above the multifunctional control assembly 400. The multifunctional control assembly 400 partitions the fuel rack 200 into a concentration zone at the middle and a dispersal zone at the periphery to form zones of different roasting temperature, and the charcoal oven 1000 is further allowed to have a smoking function via the extension member 2. The smoking includes but is not limited to steam smoking and spice smoking, so that the charcoal oven 1000 has multiple functions. The specific structure of the multifunctional control assembly 400 can be referred to the above-mentioned embodiments. Because of having adopted all the technical solutions of all the above-mentioned embodiments, the charcoal oven 1000 therefore has at least all the beneficial effects brought by the technical solutions of the above-mentioned embodiments, and there is no need to repeat them here.

The above-mentioned are only some preferred embodiments of the present application, and are not intended to limit the scope of the present application. Any structural variation made by using the specification and the content of the drawings of the present application, or direct/indirect application on other related technical fields, should all be included in the scope of the present application.

What is claimed is:

1. A multifunctional control assembly applied to a charcoal oven, wherein the charcoal oven has a fuel rack for placing charcoals, and the multifunctional control assembly comprises:

a partition member, wherein the partition member is provided on the fuel rack and configured to partition the fuel rack into a concentration zone located at an inner side of the partition member and a dispersal zone located at an outer side of the partition member; and an extension member, wherein the extension member is provided on the partition member and in contact with the partition member, and a storage groove for storing water or spices is formed at the extension member;

wherein the partition member has a narrow end and a flared end, the partition member is configured to gradually shrink in a direction from the flared end to the narrow end, and the flared end is configured to face the fuel rack;

the multifunctional control assembly further comprises a heat insulation plate;

a connection hole is formed at the heat insulation plate, the connection hole is sleeved on a periphery wall of the narrow end, and the heat insulation plate is extended away from the narrow end; and the heat insulation plate comprises a plurality of plate-shaped units, the plate-shaped units are connected one by one in sequence along a circumferential direction of the narrow end and are enclosed to form the connection hole, and the plate-shaped units are detachably connected.

2. The multifunctional control assembly according to claim 1, wherein the extension member has a first side wall, a second side wall and two third side walls;

the first side wall fits a profile of an outer wall of the partition member, the second side wall is connected to an end of the first side wall close to the flared end, the two third side walls are spaced apart and connected to the first side wall and the second side wall, and the first side wall, the second side wall and the two third side walls enclose to form the storage groove with an opening towards the narrow end.

3. The multifunctional control assembly according to claim 1, wherein each of the plate-shaped units is provided with a limit clamping slot at one side edge and an inserting member at another side edge, and the inserting member is inserted into the limit clamping slot between two neighboring plate-shaped units.

4. The multifunctional control assembly according to claim 1, wherein at least two storage grooves are formed on the extension member, and the storage grooves are provided on the partition member along a circumferential direction of the partition member.

5. The multifunctional control assembly according to claim 1, wherein the partition member is detachably connected to the extension member.

6. The multifunctional control assembly according to claim 5, wherein one of the partition member and the extension member is provided with a hanging catch, the other one of the partition member and the extension member is provided with a hanging hole, and the hanging catch is threaded through and connected to the hanging hole, so that the extension member is hung on the partition member.

7. A charcoal oven, comprising:

an oven body, wherein the oven body is formed with a roasting chamber, a fuel rack is provided in the roasting chamber;

the multifunctional control assembly according to claim 1, wherein the multifunctional control assembly is provided on the fuel rack; and a grill, wherein the grill is provided in the roasting chamber and connected to a chamber wall of the roasting chamber, and the grill is located above the multifunctional control assembly.

* * * * *